Jan. 15, 1957  F. TOTZEK  2,777,813
APPARATUS FOR THE PERFORMANCE OF ENDOTHERMIC
REACTIONS BETWEEN SOLID AND GASEOUS MEDIA
Filed May 25, 1951
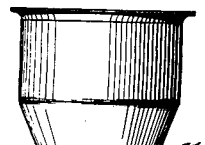
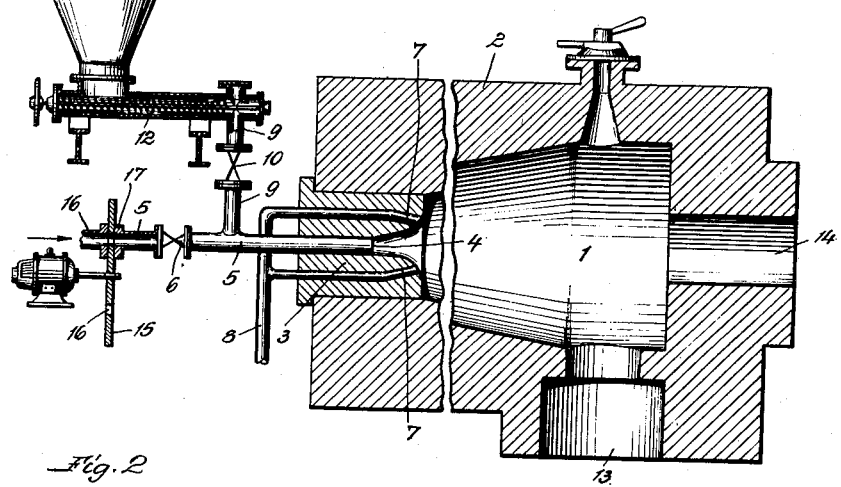
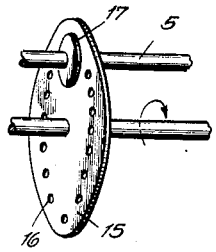
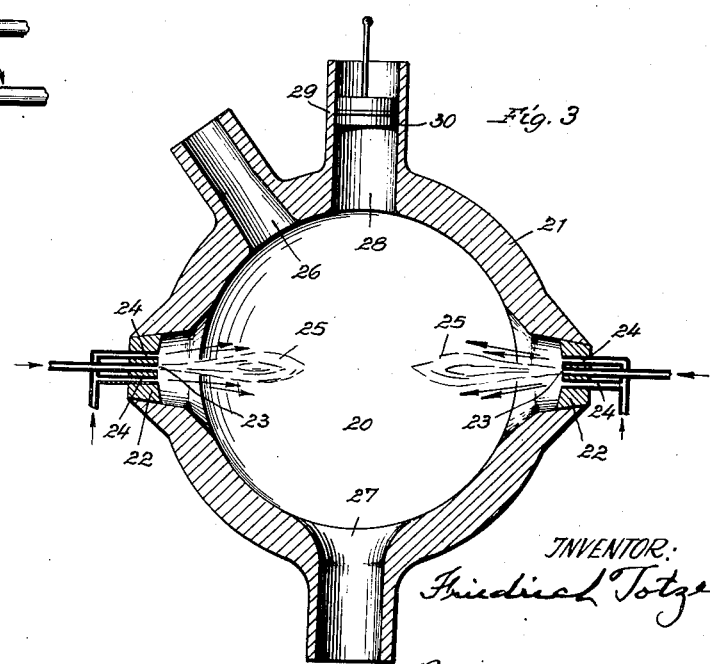
INVENTOR:
Friedrich Totzek 2,777,813
Patented Jan. 15, 1957

2,777,813

APPARATUS FOR THE PERFORMANCE OF ENDOTHERMIC REACTIONS BETWEEN SOLID AND GASEOUS MEDIA

Friedrich Totzek, Essen, Germany, assignor, by mesne assignments, to Koppers Company, Inc., Pittsburgh, Pa., a corporation of Delaware Application May 25, 1951, Serial No. 228,237

3 Claims. (Cl. 204—193)

The invention relates to a process and apparatus for the performance of endothermic reactions at increased temperature between finely divided solid and fluid gaseous media, the solid material being suspended in the gas during the reaction and moving essentially in the same direction as the gas flow. Endothermic reactions which may be performed using the new mode according to the invention are first of all the production of water gas from finely divided solid fuels and gases or vapours such as water vapour, carbon dioxide, according to the well known equation:

$$C+H_2O=CO+H_2$$

Another process to be considered here is the reduction of finely divided iron ore by means of reducing gases, such as carbon monoxide or hydrogen, according to the equation:

$$FeO+CO=Fe+CO_2$$
$$FeO+H_2=Fe+H_2O$$

Other endothermic reactions between solid and gaseous media are the production of calcium cyanamide from calcium carbide and nitrogen or calcium carbonate and ammonia respectively, as to the equations:

$$CaC_2+N_2=CaCN_2+C$$
$$CaCO_3+2NH_3=CaCN_2+3H_2O$$

Another endothermic reaction concerns the production of sodium sulphate from sodium chloride, sulphur dioxide, oxygen and steam according to the equation:

$$2NaCl+SO_2+\tfrac{1}{2}O_2+H_2O=Na_2SO_4+2HCl$$

Finally the production of cyanides from sodium carbonate and nitrogen and carbon may be mentioned:

$$Na_2CO_3+N_2+4C=2NaCN+3CO$$

All these processes which as may be seen from the respective equations are very different in details are characterized by a negative heat balance, or to say it with other words, these processes may be performed only when a sufficient amount of heat is added.

The process according to the invention may be described with more details for purpose of better understanding by considering the production of water gas by the gasifying of pulverised fuels.

According to a copending application Serial No. 43,950 the production of valuable fuel gases containing carbon monoxide and hydrogen from solid fuels such as coal, brown-coal, lignite, pitch, peat is to be performed in such a way that a highly homogeneous suspension of the finely divided solid fuel with oxygen or oxygen enriched air is introduced into a reaction chamber operating at increased temperature in form of a jet, so that the solid fuel-oxygen mixture is ignited. Simultaneously another gaseous medium which is endothermic reactive with carbon is injected into the reaction chamber preferably in a preheated state. Such media may be water vapour, carbon dioxide or a mixture of these gases. The carbon of the exothermic zone which has not been gasified but heated to a high temperature reacts with the steam or carbon dioxide as to the equations:

$$C+H_2O \rightarrow CO+H_2$$
$$C+CO_2 \rightarrow 2CO$$

These two fundamental reactions are very endothermic and may be performed with sufficient speed in the direction of the arrows only when high temperatures for the reaction components are used.

In the well-known intermittent water gas process, the fuel to be gasified, for instance coke, is at first partly burned with oxygen (air) to produce a high temperature in the fuel bed (blowing step). Then the hot coke is contacted with steam in such a way that a flow of steam is passed through the fuel bed (gasifying step), resulting in a heavy relative movement between the solid fuel and the gasifying means. This relative movement is most important because of the fact that the surface of the fuel will be enveloped during the gasification by a veil of water gas produced which would prevent the further reaction between carbon and steam if the steam flow through the fuel bed would not rinse the gaseous veil permanently.

The production of water gas by gasifying finely divided solid fuels suspended in a gaseous carrier medium takes place under other conditions than those when a coarse fuel, such as coke, is used. The first difference consists in that the heat production by the exothermic reaction between fuel and oxygen during the gasification in suspension is rather small if the useful fuel gas must contain only few carbon dioxide or if a minimum consumption of the very expensive oxygen is to be obtained. The solid reaction component therefore does not reach the high temperatures as are known in the intermittent water gas process using coarse fuels.

Another essential difference between the intermittent water gas process and the gasification of a suspended fuel is to be seen in the comparatively small relative movement between fuel and steam or carbon dioxide which is caused in that the finely pulverized fuel suspended in the flowing gaseous medium is moving in the same direction as the carrier gas. In order to make the steam contact the solid carbon particles which are enveloped by a gas veil, it is necessary to raise the temperature of the reaction components to a very high degree as the diffusion of the steam through the gaseous envelope of the fuel particle takes place with high rate only when high temperatures are applied. It is no doubt that these high temperatures may be produced by the exothermic reaction of the fuel with oxygen, but only by considerably raising the consumption of oxygen.

Furthermore it may be mentioned that the initial temperature at the surface of the solid fuel when suspended in a gaseous carrier rapidly sinks down by the intensive heat consumption of the endothermic water gas process, so that the reactions begin running slowly and the fuel gases produced must be drawn off from the reaction chamber while still having an undesired high temperature.

The conditions of the production of water gas by gasifying in suspension of a finely divided solid fuel are quite similar to those other processes between solid and gaseous media as described in the introduction. By performing these processes and reactions always a gaseous envelope is formed at the surface of the small particles of the solid stuff which renders more difficult or even prevents a further contact of the solid stuff with the gaseous reaction components.

The exothermic reaction, for instance between a finely pulverized solid fuel and oxygen, depends only in a little way on the relative movement between fuel and gas as probably the large production of heat at the surface of the fuel particles causes the gaseous envelope formed to be loosed or entirely removed so that a very high speed of the exothermic reaction may easily be developed.

The present invention is based on the idea that the endothermic reactions between finely divided solid and gaseous reaction components are to be accelerated by influencing the reaction components by means of sonic waves or vibrations of suitable frequencies in such a way that the solid medium and the gases are caused to oscillate with different amplitudes so that the gaseous envelope surrounding the solid particles is more or less destroyed thus enabling the gaseous medium components to contact more intensively the surface of the solid particles.

In the field of the water gas production the invention results in an effect similar to that caused in the intermittent water gas process by the strong relative movement between the unmoved fuel bed and the hot steam passing therethrough.

The water gas production, when performed according to the invention, by gasifying of a finely divided solid fuel and simultaneously influencing the reaction components by sonic waves or vibrations runs at considerably higher rate than in case of the intermittent gasifying process using an unmoved fuel bed and may be completed at essentially lower temperatures than in that mode of operation in which the lowest temperatures of the drawn-off gases are stipulated only by the natural diffusion of the hot fuel particles of the exothermic zone. Therefore it is possible to reach now the same grade of gasification, or with other words, the final or end point of the water gas reaction at a lower initial temperature of the gaseous media which simultaneously allows the consumption of expensive oxygen for the exothermic reaction or preheating of the gaseous media to be considerably reduced, or, the initial temperature of the gaseous components being kept at a preferred higher level. The gasification process according to the invention may approach more closely the highest possible value that theoretically may be reached if all conditions, for instance temperature, rate of flow and so on, of the reaction components are established with regard to the given grain size of the solid fuel.

Sonic waves or vibrations according to the invention may be considered as local and temporal successive compressions and expansions of a finely divided medium and wherein the direction of the successive changes of state of the finely divided medium is essentially conformed with the direction of the forward spreading of the vibrations. This sort of waves or vibrations are usually called longitudinal sonic waves.

The frequencies of the sonic waves to be imposed to the reaction components according to the invention principally depends on the grain size and specific weight of the solid particles and on the viscosity of the gaseous media.

In case of gasifying in suspension of finely pulverized coal with oxygen and steam the frequency of the vibrations to be supplied preferably lay at 2000–7000 cycles per second (Hertz) if the maximum diameter of the fuel particles is as large as about 0.05–0.1 mm. The smaller the grain size of the fuel particles the higher the frequency of the vibration must be established although waves or vibrations of a wide range of frequency have been found to influence the gasification process in the same way. It seems, however, that in the same cases very high frequencies, such as 20,000 Hertz, show an effect that is smaller than may be reached when using waves of lower frequencies.

The generation of sonic waves or vibrations for the purpose as set forth may be performed in different manners. For instance it is possible to interrupt a gas or steam flow in a tube by a perforated plate rotating on an axis outside the tube. Behind the perforated plate—seen in direction of the gas flow—the gas or vapour will then be compressed and expanded periodically, as is the characteristic feature of a sonic wave.

Another mode of the generation of sonic waves consists in using a cylindrical space annexed to the reaction chamber and opened to the latter and in which a piston is driven by a motor to make a to and fro movement. By this movement of the piston the air or gas or vapour near the cylindrical space in the reaction chamber is compressed and expanded in a preferred frequency.

Finally it may be mentioned that it is possible to use any known mode of sonic waves generation such as air or steam pipes, sirens, electric horns etc.

The transmission of the sonic waves produced in the above described manner onto the gas or gas solid mixture in the reaction chamber vibrate in a preferred frequency may be performed in different ways.

In case of the gasification in suspension of a finely divided fuel with oxygen the performed homogeneous mixture of fuel and oxygen may be put into vibrations before entering the reaction chamber by interrupting the flow of oxygen periodically with a desired frequency. It is also possible, however, to add to the reaction components in the exothermic zone an oscillating (by a siren) steam or gas flow such as the steam to be used as an endothermic with carbon reactive component. This latter mode of operation is of advantage when the exothermic reaction between fuel and oxygen is to be uninfluenced by direct vibrations.

The following table shows the advantageous effect of the method according to the invention in the example of the production of water gas from a finely divided solid fuel in suspension with oxygen.

When using a coal with 6745 kcal./kg. net calorific value the respective values are as follows:

|  | no sonic waves used | sonic waves used |
|---|---|---|
| fuel _____kg__ | 1,000 | 1,000 |
| oxygen (98 p. c.) _____Nm³__ | 540 | 516 |
| steam _____kg__ | 529 | 478 |
| water gas _____Nm³__ | 1,937 | 2,132 |
| CO₂+H₂ in the water gas _____Nm³__ | 1,643 | 1,852 |
| reaction temp. _____° C__ | 1,270 | 1,040 |

Nm³=cubic meters at normal conditions, i. e. 0° C. and 1 atmos. pressure.

Instead of injecting the fuel by a stream of oxygen into the reaction chamber and partly burning the fuel in order to produce the heat for the endothermic reaction between carbon and steam it is also possible to suspend the solid fuel in a preheated gas or vapour containing no free oxygen. This mode of operation, wherein the carrier gas may be recirculated, is well-known as the spul gas-water gas generation.

The method according to the invention may be performed under normal pressure as well as under increased pressure.

For the realisation of the invention it has been found as an advantage to establish the frequency of the sonic waves in regard to the larger particles of the finely divided solid material. In case of the gasification in suspension of a pulverized fuel with oxygen the investigations showed that good results in the primary (exothermic) and secondary (endothermic) reactions may be obtained when about 80 percent of the fuel have a grain size of not more than 0.06 mm. The frequency of the sonic waves was chosen to about 50 cycles per second. It was found that this frequency causes a heavy relative movement between the larger particles of the fuel and the gas/steam atmosphere. This relative movement may be about half of the amplitude of the sonic wave which effects the vibrations. In this way the reactions between the larger particles of the fuel and the gas or steam are considerably accelerated and a higher yield of valuable gases is obtained. The smaller particles of the fuel while influenced by sonic waves do not oscillate or only oscillate with very small amplitudes, but that makes no difference as the speed of the reactions between the solid material and the gases or vapours, even without applying sonic waves, is found to be so much the better the smaller the particles of the solid stuff are pulverized.

The application of sonic waves within a range of rather low frequencies has an important advantage in that the generation of very intensive sonic waves of low frequency may be performed by using rather simple mechanical means.

The drawings show diagrammatically the apparatus for the performance of two different processes between finely divided solid media and gases or vapours.

Fig. 1 shows an apparatus for the production of calcium cyanamide from calcium carbide and nitrogen, Fig. 2 shows a perspective view of the sonic waves generator as used in Figure 1 and Fig. 3 shows an apparatus for the method according to the invention in regard of the production of water gas from pulverized coal and oxygen and steam.

The apparatus as per Figure 1 involves a reaction chamber 1 which is constructed from refractory material 2 and is held during operation at an increased temperature. The reaction chamber is preferably shaped like a truncated cone, the smaller end of which comprises a nozzle equipment 3. This nozzle equipment 3 consists in a central nozzle 4 which is connected to a source for nitrogen (not shown) by pipe 5 and valve 6. The central nozzle 4 is surrounded by a series of nozzles 7 connected outside the nozzle equipment with a main line 8, the latter being connected with a source for a fuel-oxygen mixture (not shown). Instead of surrounding the central nozzle 4 by a series of nozzles 7 it is also possible to provide one annular nozzle.

Finely divided calcium carbide is introduced into the line 5 for nitrogen by line 9 and valve 10. The said medium is seized by the nitrogen flow forming an homogeneous suspension of the former in the latter. To complete the formation of the suspension it is necessary to construct the line 5 in such a way that an injector nozzle is formed at the place where the solid medium and the nitrogen contacts.

The finely divided solid medium is taken from a hopper 11 from which it is transported by means of a conveyor worm 12 into the line 9 passing the latter by freely falling into line 5.

The suspension of calcium carbide in nitrogen is injected into the reaction chamber 1 by nozzle 4 and joins with the fuel-oxygen mixture injected by nozzle 7. Due to the high temperature of the reaction chamber the fuel-oxygen mixture is immediately ignited and the heat produced by this burning process raises the temperature of the calcium carbide as well as of the nitrogen to such a degree that the endothermic reaction between these two components is completed. The calcium cyanamide formed sinks down on its way through the reaction chamber and finally reaches the outlet 13 from which it may be continuously drawn off. The waste gases and—if any—the surplus of reaction gases leave the reaction chamber through the gas outlet 14 and flow into a dust separator (not shown) of well known design in which the solid media are separated from the gases.

In order to enlarge the relative movement between the solid medium and nitrogen the line 5 is fitted with an interrupting switch in form of a perforated rotating plate 15 cutting the continuous flow of nitrogen into separated shock-like parts. The perforated plate 15 shows a series of holes 16 which allows the nitrogen to pass through line 5 in that moment when a hole lies within the cross section of line 5. Tightening means 17 are provided in order to prevent the nitrogen to escape at the place where the plate 15 cuts the line 5. The shock-wise movement of the nitrogen is transmitted onto the solid material, here calcium carbide, which is suspended in the flow of nitrogen. But as the oscillation of the solid medium shows a lag of phase in respect to the suspending gas a heavy relative movement between solid and gaseous media takes place which, in the given example, serves principally to allow the heat from the exothermic reaction between fuel gas and oxygen to be transferred easily to the solid particles.

The apparatus as shown in Fig. 3 relates to the production of water gas using finely divided solid fuel such as coal, brown coal, lignite, peat or the degasified products of solid fuel such as coke, low temperature coke etc.

The reaction chamber 20 has spherical form with refractory walls 21. There are provided two nozzle equipments 22 which, similar to Fig. 1, consist in a central nozzle 23 and a series of nozzles 24 surrounding the central nozzle. The central nozzle 23 is used for injecting an homogeneous fuel-oxygen mixture from a source (not shown) into the reaction chamber 20. As soon as the fuel-oxygen mixture has been injected into the reaction chamber 20 the exothermic reaction between the fuel and oxygen begins forming a central or primary zone of very high temperature as indicated at 25. The fuel is gasified under production of a fuel gas containing carbon monoxide and a rather small amount of carbon dioxide, the gas being drawn-off at 26. The ash falls into the outlet opening 27 and may be removed therefrom either continuously or periodically.

Simultaneously to the injection of the fuel-oxygen mixture a preheated gaseous medium which is endothermic reactive with the carbon of the fuel is introduced by nozzles 24 in such a way that the central zone 25 is surrounded by a closed gaseous envelope moving substantially in the same direction as the primary fuel-oxygen mixture. The part of the carbon of the fuel which has not been oxidized to form carbon monoxide in the primary zone moves outwardly by diffusion and as it has a very high temperature reacts on the envelope of endothermic reactive media, such as steam under formation of water gas.

In order to rinse or destroy the veils which have formed on the surface of each of the fuel particles the whole interior of the reaction chamber that is the hydrogen mass of gases, vapours and the solid medium is shaked by a heavy vibration which effects a strong relative movement between the interior solid particle and the surrounding gas envelope.

The generation of the vibrations or sonic waves is performed by a piston 30 moving to and fro in a cylindrical space 29 which has been annexed to the reaction chamber at 28. The movement of the piston 29 causes the gases near 28 to be compressed or expanded in a preferred frequency. This periodical change of state or pressure fluctuation spreads into the other parts of the reaction chambers shaking the solid particles and destroying the gas envelopes around each of them. Thus a further amount of gasifying means—oxygen, steam, carbon dioxide—may reach the surface of the solid fuel grains which then are completely gasified. It is of advantage to provide for the piston 30 the same refractory material as has been used for the wall construction.

The term "gaseous" and "gases" in the claims of the present case refer to vapors as well as gases.

Having now described the invention and in what manner the same is to be performed it is to state that the invention should not be limited to the given examples but includes all forms of realisations within the scope of the following claims.

I claim:

1. Apparatus for gasifying a finely-divided, solid, carbonaceous fuel with a free oxygen-containing gas and chemically combined oxygen-containing fluid capable of reacting endothermically with said fuel, comprising means for suspending said fuel in sufficient free oxygen-containing gas to burn a sufficient portion, but not all, of said fuel to heat the remainder of said fuel to elevated temperatures, means for jetting said suspension into a reactor at ignition temperatures, wherein said suspension ignites and burns as it flows through a combustion zone within said reactor, means for introducing said fluid into said reactor, means for peripherally enveloping said jet as it issues into said reactor and ignites in said combustion zone within a segregated, annular stream of said fluid, flowing in the same direction as said suspension along, outside of, and around the periphery of said jet and combustion zone and forming an insulating layer between said combustion zone and the walls of said reactor, means for, thereafter, commingling the annular stream of said fluid with the reaction products and said preheated remainder of said fuel flowing from said combustion zone, means for generating sonic waves outside of said reactor and means for subjecting the reactants within said reactor to said sonic waves.

2. The apparatus of claim 1, wherein said means for generating sonic waves comprises a rotating perforated plate for cutting the continuous gas flow to be oscillated into separated shockwise particle flows.

3. The apparatus of claim 1, wherein said means for generating said sonic waves comprises a piston adapted to move to and fro in a cylindrical space open at one end, said one end being adjacent to and opening into said reactor and forming a uniform structure therewith.

References Cited in the file of this patent

UNITED STATES PATENTS

| | | |
|---|---|---|
| 1,939,302 | Heaney | Dec. 12, 1933 |
| 2,500,008 | Richardson | Mar. 7, 1950 |
| 2,517,141 | Smith | Aug. 1, 1950 |
| 2,558,038 | Calhoun | June 26, 1951 |

FOREIGN PATENTS

| | | |
|---|---|---|
| 823,231 | France | Oct. 11, 1937 |
| 508,675 | Great Britain | June 26, 1939 |

OTHER REFERENCES

Outlines of Theoretical Chem., by F. H. Getman and F. Daniels, 5th ed. (1931), John Wiley & Sons, New York, pp. 347–349.

J. Amer. Chem. Soc., vol. 58 (1936), pp. 1069–1076.

Industrial & Eng. Chem. (April 1948), pp. 567–571.

Chem. Eng. Progress (January 1950), pp. 3–6.

Chem. & Eng. News, vol. 28 (June 12, 1950), pp. 2002–3.